United States Patent [19]

Nagatomi

[11] Patent Number: 5,587,915
[45] Date of Patent: Dec. 24, 1996

[54] TOOL DAMAGE PREVENTION SYSTEM

[75] Inventor: Takashi Nagatomi, Minamitsuru-gun, Japan

[73] Assignee: Fanuc Ltd., Japan

[21] Appl. No.: 360,780

[22] PCT Filed: Apr. 21, 1994

[86] PCT No.: PCT/JP94/00668

§ 371 Date: Dec. 29, 1994

§ 102(e) Date: Dec. 29, 1994

[87] PCT Pub. No.: WO94/26465

PCT Pub. Date: Nov. 24, 1994

[30] Foreign Application Priority Data

May 11, 1993 [JP] Japan .................................. 5-109153
Jun. 10, 1993 [JP] Japan .................................. 5-138293

[51] Int. Cl.$^6$ ............................................. G05B 19/4065
[52] U.S. Cl. ............................... 364/474.19; 364/474.17; 364/474.21; 364/474.3; 318/565
[58] Field of Search .................... 364/474.16, 474.17, 364/474.19, 474.2, 474.21, 184, 474.3, 507; 318/625, 571, 568.18, 565

[56] References Cited

U.S. PATENT DOCUMENTS

| 4,745,563 | 5/1988 | Kaku et al. ............................ 364/565 |
| 4,943,759 | 7/1990 | Sakamoto et al. ................. 318/568.11 |
| 5,091,684 | 2/1992 | Iwashita ................................... 318/616 |
| 5,115,418 | 5/1992 | Shimada ................................... 318/616 |
| 5,239,248 | 8/1993 | Shimada et al. ................... 318/568.12 |
| 5,304,906 | 4/1994 | Arita et al. ......................... 318/568.16 |

FOREIGN PATENT DOCUMENTS

| 3-3755 | 1/1991 | Japan . |
| 3-110606 | 5/1991 | Japan . |
| 3-72429 | 11/1991 | Japan . |

Primary Examiner—Joseph Ruggiero
Attorney, Agent, or Firm—Staas & Halsey

[57] ABSTRACT

A tool damage prevention system is provided which can easily detect an abnormal load with high accuracy to reliably prevent damage to a tool, and which also can appropriately cope with abnormality even if tool damage or the like has already occurred. A first disturbance torque estimating device estimates a disturbance torque Ys acting on a spindle motor, based on a velocity signal X1s from the spindle motor (spindle) and a torque command value U1s for the spindle motor. A second disturbance torque estimating device estimates a disturbance torque Yz acting on a servomotor, based on a velocity signal X1z from the servomotor (feed shaft) and a torque command value U1z for the servomotor. A comparing device obtains a composite disturbance torque Y by combining the estimated disturbance torques Ys and Yz, and compares the composite disturbance torque Y with a preset reference torque Ye. A deceleration/stop command device outputs a command signal to decelerate or stop the tool feed or to change the tool in accordance with the result of the comparison.

4 Claims, 5 Drawing Sheets

TOOL DAMAGE PREVENTION SYSTEM

BACKGROUND OF THE INVENTION

1. Field of the Invention

The present invention relates to a tool damage prevention system for preventing damage to a tool used in a numerically controlled machine tool.

2. Description of the Related Art

In machine tools, a tool can be damaged due to abnormal load applied thereto during a cutting operation, and therefore, various measures are taken to prevent such damage. Tool damage prevention methods primarily rely upon the detection of cutting load, and typical methods for detecting the cutting load are as follows:

(1) A method using an external sensor arranged on a table, a tool holder or the like.

(2) A method utilizing a current value of a spindle motor.

In the conventional method (1), however, a sensor must be arranged externally, and a control device for processing the sensor signal must be provided separately from a numerical control device, which leads to complicated arrangement and higher cost.

In the conventional method (2), since the current value of the spindle motor involves rotating load or acceleration/deceleration load of the spindle, the detection accuracy is poor and tool damage cannot be detected with accuracy.

SUMMARY OF THE INVENTION

The present invention was created in view of the above circumstances, and an object thereof is to provide a tool damage prevention system which can easily detect abnormal load with high accuracy to reliably prevent damage to a tool and which also can appropriately cope with abnormality when tool damage or the like has already occurred.

To achieve the above object, the present invention provides a tool damage prevention system for preventing damage to a tool used in a numerically controlled machine tool, comprising first disturbance torque estimating means for estimating a disturbance torque acting on a spindle for rotating the tool, second disturbance torque estimating means for estimating a disturbance torque acting on a feed shaft for controlling feed of the tool, comparing means for comparing a third estimated disturbance torque, obtained by combining the disturbance torques estimated by the first and second disturbance torque estimating means, with a preset reference torque, and deceleration/stop command means for outputting a command signal to decelerate or stop the feed of the tool or to change the tool in accordance with a result of the comparison by the comparing means.

The first and second disturbance torque estimating means estimate the disturbance torques acting on motors for driving the spindle and the feed shaft, respectively, by means of disturbance estimating observers; therefore, the loads applied to the spindle and the feed shaft, i.e., the load applied to the tool, can be estimated with accuracy. The comparing means obtains a composite disturbance torque by combining the disturbance torques acting on the spindle and the feed shaft, and compares the composite disturbance torque with the preset reference torque. The reference torque serves as an abnormal load detection level, and is set variably in accordance with factors such as tool types, hardness of workpieces, etc. Since the composite disturbance torque associated with both the spindle and the feed shaft is compared with the reference torque, the abnormal load detection level can be set so as to match the machining conditions then set.

In accordance with the result of the comparison by the comparing means, the deceleration/stop command means outputs a command signal to decelerate or stop the tool feed or to change the tool.

DETAILED DESCRIPTION OF THE PREFERRED EMBODIMENT

An embodiment according to the present invention will be described with reference to the drawings.

Figure 1:
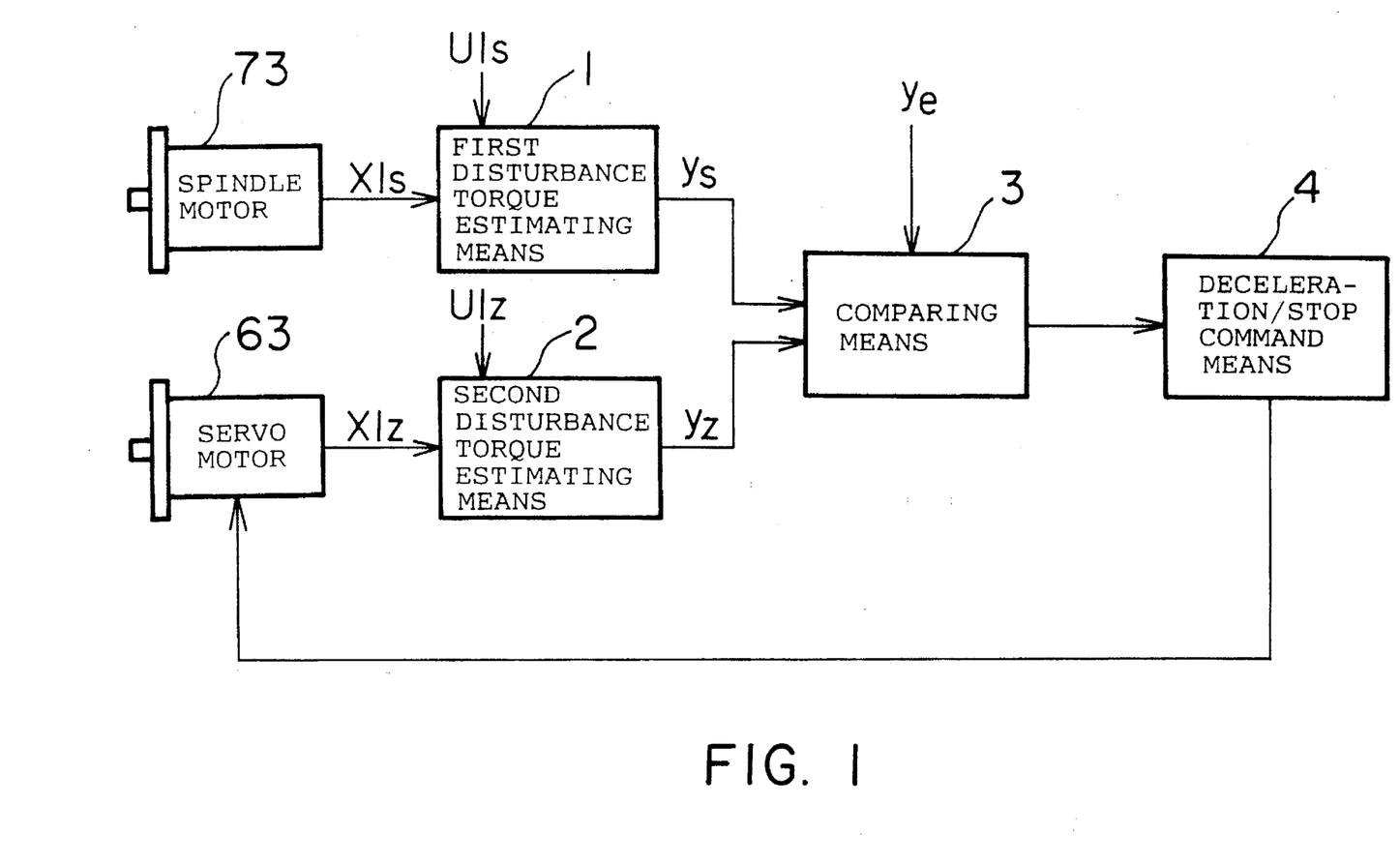
FIG. 1 is a block diagram illustrating the principles of a tool damage prevention system according to the present invention.

FIG. 1 is a block diagram illustrating the principles of a tool damage prevention system according to the present invention. In the figure, first disturbance torque estimating means 1 estimates a disturbance torque Ys acting on a spindle motor 73, based on a velocity signal X1s from the spindle motor (spindle) 73 and a torque command value U1s for the spindle motor 73. Second disturbance torque estimating means 2 estimates a disturbance torque Yz acting on a servomotor 63, based on a velocity signal X1s from the servomotor (feed shaft) 63 and a torque command value U1z for the servomotor 63. Comparing means 3 obtains a composite disturbance torque Y by combining the estimated disturbance torques Ys and Yz, and compares the composite disturbance torque Y with a preset reference torque Ye. If it is judged by the comparing means 3 that the composite disturbance torque Y is greater than the reference torque Ye, deceleration/stop command means 4 outputs a command signal to decelerate or stop the tool feed or to change the tool in accordance with the result of the judgment.

Figure 2:
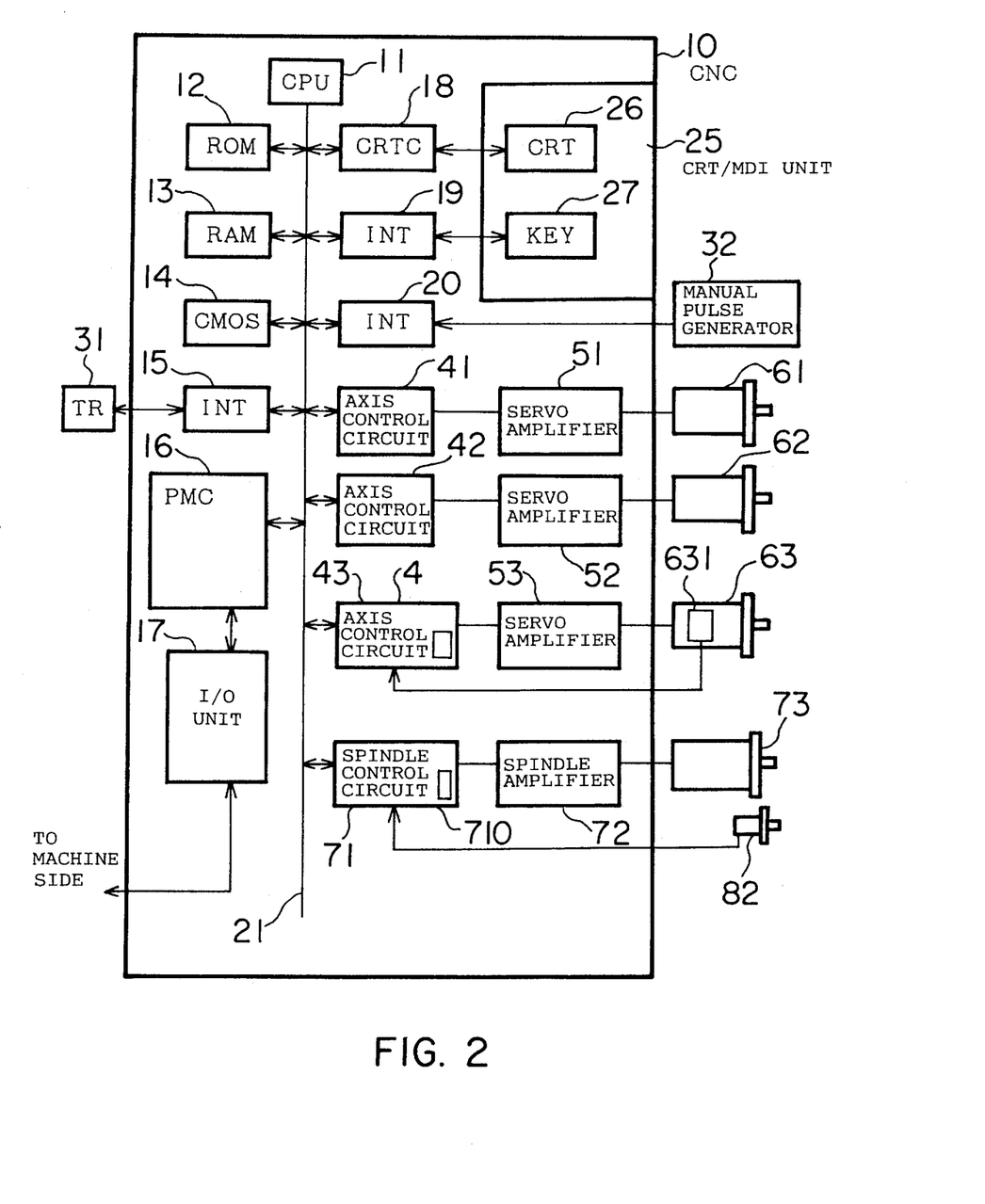
FIG. 2 is a block diagram of the hardware of a numerical control device (CNC) for carrying out the tool damage prevention system of the present invention.

FIG. 2 is a block diagram of the hardware of a numerical control device (CNC) for carrying out the tool damage prevention system of the present invention. In the figure, reference numeral 10 denotes a numerical control device (CNC). A processor 11, which is a primary processor for globally controlling the numerical control device (CNC) 10, reads via a bus 21 a system program stored in a ROM 12, and controls the entire operation of the numerical control device (CNC) 10 in accordance with the system program. A RAM 13 stores temporary data such as calculation data and display data. A DRAM is used for the RAM 13. A CMOS 14 stores a machining program, various parameters, etc. The CMOS 14 comprises a nonvolatile memory backed up by a battery, not shown; therefore, data stored therein can be retained even if the power supply to the numerical control device (CNC) 10 is cut off.

An interface 15 for external equipment is connected to external equipment 31 such as a paper tape reader, a paper tape puncher, a paper tape reader-puncher, etc. A machining program is read via the paper tape reader, and a machining program edited within the numerical control device (CNC) 10 can be output to the paper tape puncher.

A PMC (programmable machine controller) 16 is built in the CNC 10 and controls a machine in accordance with a sequence program created in ladder format. Specifically, the PMC 16 converts M-, S- and T-functions, specified by the machining program, to signals required on the machine side in accordance with the sequence program, and outputs the converted signals to the machine side through an I/O unit 17. The signals thus output are used for driving magnets etc. on the machine side and for actuating hydraulic valves, pneumatic valves, electric actuators, etc. Also, the PMC 16 is supplied with signals from limit switches on the machine side and switches etc. on a machine control panel, processes the input signals, and transfers the processed signals to the processor 11.

A graphic control circuit 18 converts digital data, such as data on current positions of individual axes, alarms, parameters, image data, etc., to image signals, which are then output. The image signals are supplied to a display device 26 of a CRT/MDI unit 25 and displayed thereat. An interface 19 receives data from a keyboard 27 of the CRT/MDI unit 25 and transfers the received data to the processor 11.

An interface 20 is connected to a manual pulse generator 32 and supplied with pulses therefrom. The manual pulse generator 32 is mounted on the machine control panel and is used for manually positioning a machine operating part with accuracy.

Axis control circuits 41 to 43 are supplied with move commands for the individual axes from the processor 11 and output commands for the respective axes to corresponding servo amplifiers 51 to 53. On receiving the move commands, the servo amplifiers 51 to 53 drive respective servomotors 61 to 63 associated with the axes. The servomotor 63, which controls Z-axis feed, has a position detection pulse coder 631 built therein, and a position signal from the pulse coder 631 is fed back to the axis control circuit 43 in the form of a pulse train. Like the servomotor 63, the servomotors 61 and 62 for controlling the feed of X and Y axes, respectively, each have a position detection pulse coder built therein, though not shown in the figure, and a position signal from the pulse coder is fed back in the form of a pulse train. A linear scale may be used as the position detector, if required. The velocity signal X1s can be obtained by subjecting the pulse train to F/V (frequency/velocity) conversion.

The axis control circuit 43 is provided with a processor, not shown, for carrying out software processing and has an observer 410 as part thereof. The observer 410 is supplied with the velocity signal X1s etc. and estimates the disturbance torque Yz acting on the servomotor 63. The estimated disturbance torque Yz is supplied to the PMC 16, as described in detail later.

A spindle control circuit 71 is supplied with a spindle rotation command, a spindle orientation command, etc., and outputs a spindle velocity signal to a spindle amplifier 72. On receiving the spindle velocity signal, the spindle amplifier 72 rotates a spindle motor 73 at the commanded rotational speed. Also, the spindle is positioned at a predetermined position in accordance with the orientation command.

A position coder 82 is coupled to the spindle motor 73 via gears or a belt. Accordingly, the position coder 82 rotates in synchronism with the spindle motor 73, and a feedback pulse output from the position coder 82 is fed back to the spindle control circuit 71. This pulse train is subjected to F/V (frequency/velocity) conversion, to thereby obtain the velocity signal X1s.

Like the axis control circuit 43, the spindle control circuit 71 is provided with a processor, not shown, for carrying out software processing and has an observer 710 as part thereof. The observer 710 is supplied with the velocity signal X1s etc. and estimates the disturbance torque Ys acting on the spindle motor 73. The estimated disturbance torque Ys is supplied to the PMC 16, like the aforementioned estimated disturbance torque Yz.

On receiving the estimated disturbance torques Yz and Ys, the PMC 16 executes a predetermined software processing. Specifically, the estimated disturbance torques Yz and Ys are combined to obtain a composite disturbance torque Y, which is then compared with the reference torque Ye to detect abnormal torque. When an abnormal torque is detected, a tool feed stop command or the like is output.

Figure 3:
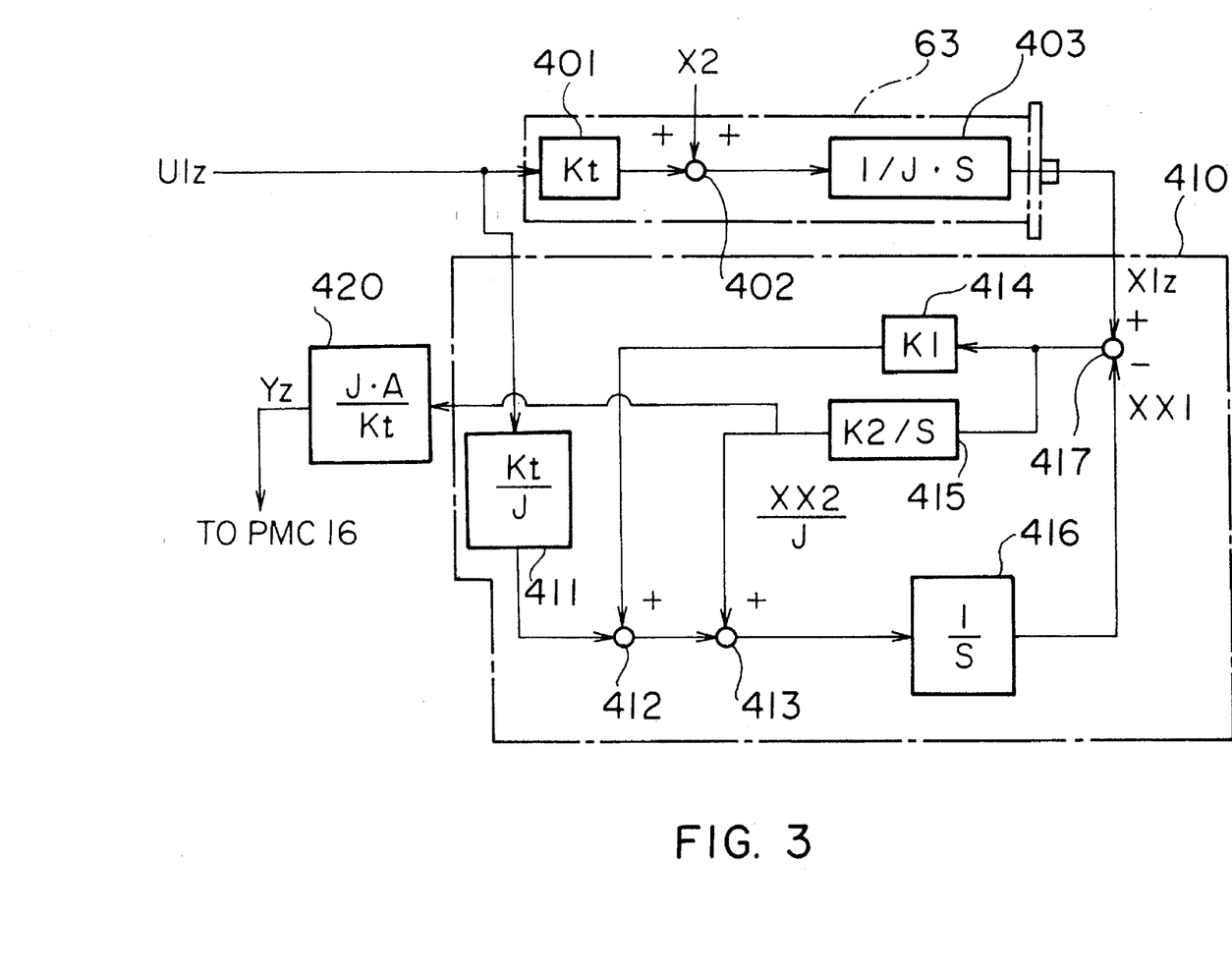
FIG. 3 is a block diagram showing an observer according to the present invention.

FIG. 3 is a block diagram illustrating the observer according to the present invention. The process shown in the block diagram is executed by the observer 410 of the axis control circuit 43 and the observer 710 of the spindle control circuit 71, as mentioned above. The observers 410 and 710 have the same arrangement; therefore, only the observer 410 is explained and description of the observer 710 is omitted.

In FIG. 3, current U1z represents a torque command value output to the servomotor 63 in accordance with the move command from the processor 11. The current U1z is supplied to an element 401, which then provides an output torque of the servomotor 63. The output torque of the servomotor 63 is added to a disturbance torque X2 at an arithmetic element 402. The output of the arithmetic element 402 is supplied to an element 403, which then provides a velocity signal X1s. Symbol J represents the inertia of the servomotor 63.

The current U1z is also supplied to the observer 410. The observer 410 obtains an estimated velocity XX1 based on the current U1z and the velocity X1s of the servomotor 63, and controls the velocity of the servomotor 63. The velocity control for the servomotor 63 is not be explained here, and only the arithmetic operation for estimating the disturbance torque will be described. The current U1z is multiplied by (Kt/J) at an element 411, the output of which is supplied to an arithmetic element 412. At the arithmetic element 412, the output of the element 411 is added to the feedback from an element 414, and at an arithmetic element 413, the output of the element 412 is added to the feedback from an element 415. The outputs from the arithmetic elements 412 and 413 are in the unit of acceleration. The output of the arithmetic unit 413 is supplied to an integral element 416, which then outputs an estimated velocity XX1. An arithmetic element 417 obtains the difference between the estimated velocity XX1 and the actual velocity X1s, which difference is fed back to the arithmetic element 414 and the integral element 415. The proportional element 414 has a gain K1, and the integral element 415 has a gain K2. The frequency band to be fed back is determined by the gains K1 and K2.

The output of the integral element 415 represents an estimated acceleration (XX2/J) obtained by dividing the estimated disturbance torque XX2 by J, and is converted to a current value by a proportional element 420. This current value is expressed as a torque, i.e., the estimated disturbance torque Yz. Symbol J denotes the inertia of the servomotor 63 and is identical to J of the aforesaid element 403, and Kt denotes a torque constant identical to that of the element 401. Symbol A denotes a coefficient having a value smaller than or equal to "1" and is used to correct the estimated acceleration (XX2/J). In this manner, the estimated disturbance torque Yz of the servomotor 63 is obtained using the observer 410, and is supplied to the PMC 16.

The estimated disturbance torque Ys of the spindle motor 73 is obtained by means of the observer 710 in a similar manner. In this case, the observer 710 obtains the estimated disturbance torque Ys based on the current U1s and the velocity signal X1s of the spindle motor 73. The current U1s is a torque command value output to the spindle motor 73 in accordance with the spindle rotation command from the processor 11.

The estimated disturbance torques Yz and Ys are supplied to the PMC 16. As mentioned above, the PMC 16 detects abnormal torque based on the estimated disturbance torques Yz and Ys, and upon detecting an abnormal torque, supplies a deceleration or stop command to the servomotor 63 or supplies a tool change command. The process executed by the PMC 16 will be explained with reference to FIGS. 4 and 5.

Figure 4:
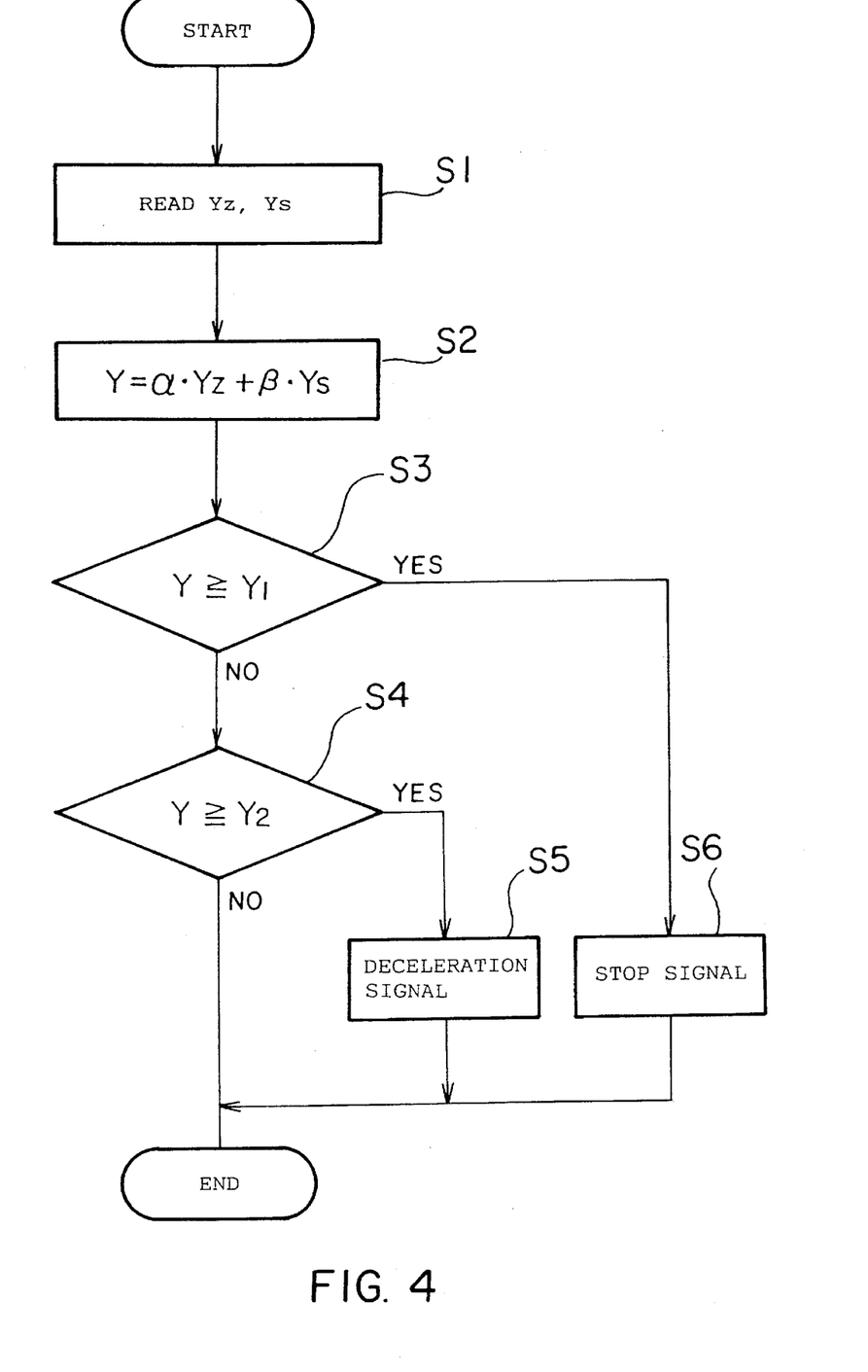
FIG. 4 is a flowchart showing a first example of a process executed by a PMC.

FIG. 4 is a flowchart showing a first example of the process executed by the PMC. In the chart, the numbers following "S" denote step numbers.

[S1] The estimated disturbance torques Yz and Ys are read.
[S2] The estimated disturbance torques Yz and Ys are combined according to the following equation (1), to obtain a composite disturbance torque Y:

$$Y=\alpha Yz+\beta Ys \qquad (1)$$

where coefficients $\alpha$ and $\beta$ are experimentally obtained in consideration of the degree of influence of Yz and Ys on an abnormal load detection level.

[S3] It is determined whether the composite disturbance torque Y takes a value greater than or equal to a preset reference torque $Y_1$. If the torque Y is greater than or equal to $Y_1$, the flow proceeds to Step S6, and if not, the flow proceeds to Step S4. The reference torques $Y_1$ and $Y_2$ each serve as an abnormal load detection level, and are set variably in accordance with factors such as tool types, hardness of workpieces, and the like.

[S4] It is determined whether the composite disturbance torque Y takes a value greater than or equal to the reference torque $Y_2$. If the torque Y is greater than or equal to $Y_2$, the flow proceeds to Step S5; if not, it is judged that the torque is not abnormal, and thus the program is ended.

[S5] Since the composite disturbance torque Y is smaller than $Y_1$ but greater than or equal to $Y_2$, a deceleration signal is output to thereby decelerate the servomotor 63.

[S6] The composite disturbance torque Y is greater than or equal to $Y_1$ and thus the torque is abnormally great; therefore, a stop signal is output so as to stop the servomotor 63.

Thus, in this embodiment, the disturbance torques acting on the servomotor 63 and the spindle motor 73 are estimated by the observers 410 and 710, respectively, to thereby detect the occurrence of abnormal load. Accordingly, tool damage can be easily prevented without the need to additionally provide external sensors. Further, since the estimated disturbance torques do not contain acceleration/deceleration load, it is possible to estimate with accuracy the loads applied to the spindle and feed shaft, i.e., the load applied to the tool, and thus detect the occurrence of abnormal load with high accuracy.

Two detection levels are employed for the reference torque Ye to permit one of two different measures, i.e., deceleration or stop, to be taken in case of abnormality; therefore, abnormal condition can be appropriately coped with.

Furthermore, since the composite disturbance torque is compared with the reference torque Ye, the abnormal load detection level can be set in accordance with machining conditions, thus making it possible to prevent tool damage with high reliability.

Figure 5:
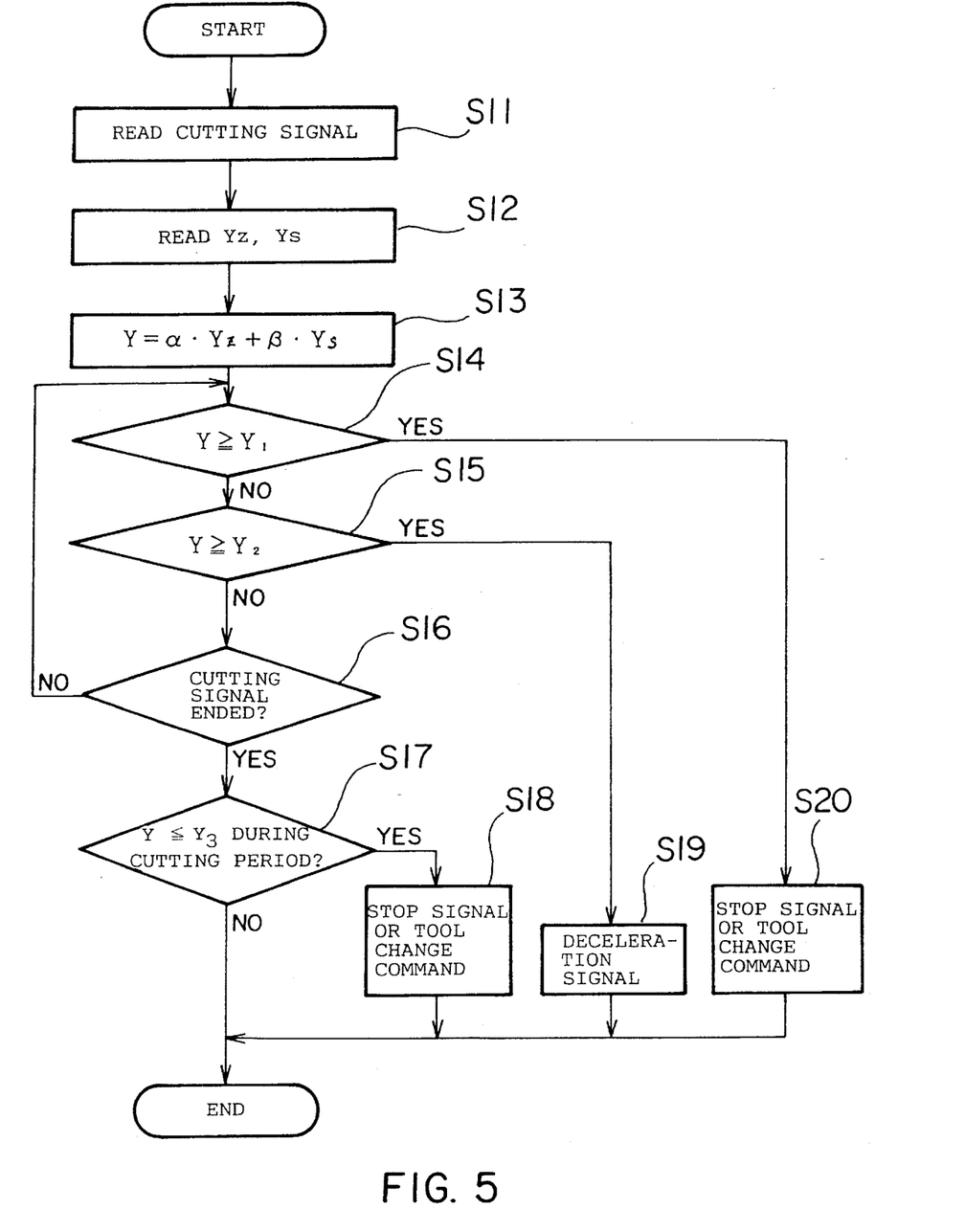
FIG. 5 is a flowchart showing a second example of a process executed by the PMC.

FIG. 5 is a flowchart showing a second example of the process executed by the PMC. In the chart, the numbers following "S" denote step numbers.

[S11] A cutting signal, which indicates that cutting operation is in progress, is read. Specifically, when the CPU reads, e.g., a G code in the machining program, it judges that cutting operation is in progress.

[S12] The estimated disturbance torques Yz and Ys are read.
[S13] The estimated disturbance torques Yz and Ys are combined according to the following equation (1), to obtain a composite disturbance torque Y:

$$Y=\alpha Yz+\beta Ys \qquad (1)$$

where coefficients $\alpha$ and $\beta$ are experimentally obtained in consideration of the degree of influence of Yz and Ys on the abnormal load detection level.

[S14] It is determined whether the composite disturbance torque Y takes a value greater than or equal to a preset reference torque $Y_1$. If the torque Y is greater than or equal to $Y_1$, the flow proceeds to Step S20, and if not, the flow proceeds to Step S15. The reference torques $Y_1$ and $Y_2$ each serve as an abnormal load detection level, and are set variably in accordance with factors such as tool types, hardness of workpieces, and the like.

[S15] It is determined whether the composite disturbance torque Y takes a value greater than or equal to the reference torque $Y_2$. If the torque Y is greater than or equal to $Y_2$, the flow proceeds to Step S19; if not, the flow proceeds to Step S16.

[S16] It is determined whether the cutting signal has ended. If the cutting signal has ended, the flow proceeds to Step S17, and if not, the flow returns to Step S14.

[S17] It is determined at the end of cutting operation whether the composite disturbance torque Y has maintained a value smaller than or equal to a reference torque $Y_3$ throughout the whole cutting period. The reference torque $Y_3$ is set at a very small level. If the torque Y has maintained a value smaller than or equal to $Y_3$, the flow proceeds to Step S18; if not, it is judged that there is no abnormality occurring, and the program is ended.

[S18] The composite disturbance torque Y is abnormally low or zero; therefore, it is judged that abnormality such as tool damage has occurred. Accordingly, a stop signal is output to stop the servomotor 63, or a tool change command is output.

[S19] Since the composite disturbance torque Y is smaller than $Y_1$ but greater than or equal to $Y_2$, a deceleration signal is output to thereby decelerate the servomotor 63.

[S20] The composite disturbance torque Y is greater than or equal to $Y_1$ and thus the torque is abnormally great; therefore, a stop signal is output so as to stop the servomotor 63. Alternatively, a tool change command is output.

Thus, in this embodiment, the disturbance torques acting on the servomotor 63 and the spindle motor 73 are estimated by the observers 410 and 710, respectively, to thereby detect the occurrence of abnormal load. Accordingly, tool damage can be easily prevented without the need to additionally provide external sensors. Futher, since the estimated disturbance torques contained no acceleration/deceleration load, it is possible to estimate with accuracy the loads applied to the spindle and feed shaft, i.e., the load applied to the tool, and thus detect the occurrence of abnormal load with high accuracy.

Three detection levels are employed for the reference torque Ye to permit one of three different measures, i.e., deceleration, stop or tool change, to be taken in case of abnormality; therefore, abnormal condition including tool damage and the like can be appropriately coped with during cutting operation.

Furthermore, since the composite disturbance torque is compared with the reference torque Ye, the abnormal load detection level can be set in accordance with machining conditions, thus making it possible to prevent tool damage with high reliability.

When the disturbance torque decreases to a very small level, it is judged that an abnormal condition such as tool damage has occurred, and thus a tool change command is output, whereby such abnormal condition can be appropriately coped with.

In the above description, the composite disturbance torque obtained by combining two estimated disturbance torques is compared with the reference torque. Alternatively, only one estimated disturbance torque associated with the spindle motor or the servomotor may be compared with the reference torque.

Further, instead of estimating the disturbance torque of the Z-axis servomotor, the disturbance torque of the X- or Y-axis servomotor may be estimated.

Furthermore, in the above description, the comparison between the estimated disturbance torque and the reference torque, generation of the deceleration/stop command, etc., are executed by the PMC. Alternatively, these operations may be carried out by the processor 11 which globally controls the numerical control device.

As described above, according to the present invention, the disturbance torques acting on the spindle and the feed shaft are estimated using the observers, to detect the occurrence of abnormal load. Accordingly, tool damage can be easily prevented without the need to additionally provide external sensors.

Further, since the estimated disturbance torques contain no acceleration/deceleration load, it is possible to estimate with accuracy the loads applied to the spindle and feed shaft, i.e., the load applied to the tool, and thus detect the occurrence of abnormal load with high accuracy.

Furthermore, since the composite disturbance torque is compared with the reference torque, the abnormal load detection level can be set in accordance with machining conditions, thus making it possible to prevent tool damage with high reliability.

When the disturbance torque decreases to a very small level, it is judged that an abnormal condition such as tool damage has occurred, and thus a tool change command is output, whereby such abnormal condition can be appropriately coped with.

I claim:

1. A tool damage prevention system for preventing damage to a tool used in a numerically controlled machine tool, comprising:

first disturbance torque estimating means for estimating a disturbance torque acting on a spindle for rotating the tool;

second disturbance torque estimating means for estimating a disturbance torque acting on a feed shaft for controlling feed of the tool;

comparing means for comparing a composite disturbance torque, obtained by combining the disturbance torques estimated by said first and second disturbance torque estimating means, with a preset reference torque; and deceleration/stop command means for outputting a command signal to decelerate or stop the feed of the tool or to change the tool in accordance with a result of the comparison by said comparing means.

2. The tool damage prevention system according to claim 1, wherein said reference torque includes two reference torques having different values; and said deceleration/stop command means outputs a command signal to stop the feed of the tool or to change the tool when said comparing means judges that the composite disturbance torque is greater than a greater one of the two reference torques, and outputs a command signal to decelerate the feed of the tool when said comparing means judges that the composite disturbance torque takes a value between the two reference torques.

3. The tool damage prevention system according to claim 1, wherein said reference torque is set at a very small level, and said deceleration/stop command means outputs a command signal to stop the feed of the tool or to change the tool when said comparing means judges that the composite disturbance torque is smaller than said reference torque.

4. The tool damage prevention system according to claim 1, wherein, provided the composite disturbance torque is Y, the disturbance torque estimated by said first disturbance torque estimating means is Ys, and the disturbance torque estimated by said second disturbance torque estimating means is Yz, the composite disturbance torque Y is given by $Y = \alpha \cdot Yz + \beta \cdot Ys$ ($\alpha$ and $\beta$ are coefficients).

* * * * *

UNITED STATES PATENT AND TRADEMARK OFFICE
CERTIFICATE OF CORRECTION

PATENT NO. : 5,587,915
DATED : December 24, 1996
INVENTOR(S) : Takashi NAGATOMI

It is certified that error appears in the above-indentified patent and that said Letters Patent is hereby corrected as shown below:

Column 2

Line 37, "$X1_s$" should be --$X1_z$--.

Column 3

Line 44, "$X1_s$" should be --$X1_z$--.
Line 50, "$X1_s$" should be --$X1_z$--.

Column 4

Line 31, "$X1_s$" should be --$X1_z$--.
Line 35, "$X1_s$" should be --$X1_z$--.
Line 50, "$X1_s$" should be --$X1_z$--.

Signed and Sealed this

Twenty-fifth Day of February, 1997

Attest:

BRUCE LEHMAN

Attesting Officer     Commissioner of Patents and Trademarks